United States Patent [19]

Wan et al.

[11] Patent Number: 5,731,818
[45] Date of Patent: Mar. 24, 1998

[54] METHOD AND APPARATUS FOR CONSTRAINED GAMUT CLIPPING

[75] Inventors: Shijie Wan, Rochester; James R. Sullivan, Spencerport, both of N.Y.

[73] Assignee: Eastman Kodak Company, Rochester, N.Y.

[21] Appl. No.: 610,779

[22] Filed: Mar. 4, 1996

Related U.S. Application Data

[63] Continuation-in-part of Ser. No. 229,938, Apr. 19, 1994, abandoned.

[51] Int. Cl.⁶ .................................................. G06T 11/40
[52] U.S. Cl. .......................... 345/431; 345/150; 358/518; 358/520
[58] Field of Search .................... 395/131, 126, 395/333–334; 358/500, 518–521, 525, 527, 518.2; 345/150–154, 431, 426, 199

[56] References Cited

U.S. PATENT DOCUMENTS

| H1506 | 12/1995 | Beratta | 345/199 |
|---|---|---|---|
| 4,843,379 | 6/1989 | Stansfield | 345/154 |
| 4,941,038 | 7/1990 | Walowit | 358/518 |
| 5,003,299 | 3/1991 | Batson et al. | 345/199 |
| 5,185,661 | 2/1993 | Ng | 358/505 |
| 5,243,414 | 9/1993 | Dalrymple et al. | 358/500 |
| 5,299,291 | 3/1994 | Ruetz | 395/109 |
| 5,319,473 | 6/1994 | Harrington | 358/501 |
| 5,321,797 | 6/1994 | Morton | 395/131 |
| 5,333,243 | 7/1994 | Best et al. | 395/109 |
| 5,416,890 | 5/1995 | Beretta | 395/131 |
| 5,481,655 | 1/1996 | Jacobs | 395/109 |
| 5,500,921 | 3/1996 | Ruetz | 395/109 |
| 5,510,910 | 4/1996 | Bockman et al. | 358/502 |
| 5,537,228 | 7/1996 | Dillinger | 358/502 |
| 5,583,666 | 12/1996 | Ellson et al. | 358/518 |

FOREIGN PATENT DOCUMENTS 0 488 656 A2  3/1992  European Pat. Off. .

OTHER PUBLICATIONS

Robertson et al.; *The Application of Perceptual Color Spaces to the Display of Remotely Sensed Imagery;* Jan. 1988; pp. 49–59.

Robertson, Philip K.; *Visualizing Color Gamuts: A User Interface for the Effective Use of Perceptual Color Spaces in Data Displays;* Sep. 1988; pp. 50–64.

U.S Application Number 08/068,887, filed on May 28, 1993, Method and Apparatus for Determining a Gamut Boundary and Boundary Descriptor, S. J. Wan.

U.S Application Number 08/068,941, filed on May 28, 1993, "Method and Apparatus for Mapping Between Color Spaces and Creating a Three Dimensional Inverse Look–up Table", S. J. Wan, R. Miller and J. Sullivan.

U.S Application Number 08/068,823, filed on May 28, 1993, "Method and Apparatus for Convex Interpolation for Color Color Calibration", S. J. Wan, R. Miller and J.Sullivan.

R.S. Gentile, E. Walowit, and J.P.Alleback, "A comparison of Techniques for Color Gamut Mismatch compensation", Journal of Imaging Technology, vol. 16, No. 5, Oct. 1990, pp. 176–181.

M.C. Stone, W.B. Cowan and J.C.Beatty, "Color Gamut Mapping and the Printing of Digital Color Images", AMC Transactions on Graphics, vol. 7, No. 4, Oct. 1988, pp. 249–292.

Primary Examiner—Joseph H. Feild
Assistant Examiner—Rudolph Buchel
Attorney, Agent, or Firm—Thomas H. Close

[57] ABSTRACT

An efficient method for gamut clipping based on user-defined constraints on lightness and hue by: a) defining a color gamut surface of an output device using a gamut descriptor; b) specifying a search range based on maximum tolerances for lightness and hue changes; and, c) for each input color data point outside the gamut, mapping the data point to the closest point in a portion of the gamut surface specified by the search range.

8 Claims, 8 Drawing Sheets

METHOD AND APPARATUS FOR CONSTRAINED GAMUT CLIPPING

This is a Continuation of application Ser. No. 08/229,938, filed Apr. 19, 1994 now abandoned.

CROSS-REFERENCE TO RELATED APPLICATION

This application is related to the previously filed applications by S. J. Wan, "Method and Apparatus for Determining a Gamut Boundary and a Gamut Descriptor", U.S. Ser. No. 08/068,887, filed May 28, 1993 now abandoned and continued as U.S. Ser. No. 08/782,852; S. J. Wan, R. Miller, and J. Sullivan, "Method and Apparatus for Mapping Between Color Spaces and Creating a Three-dimensional Inverse Look-up Table", U.S. Ser. No. 08/068,941 filed May 28, 1993 now abandoned; and S. J. Wan, R. Miller and J. Sullivan, "Method and Apparatus for Convex Interpolation for Color Calibration", U.S. Ser. No. 08/068,823 filed May 28, 1993 now U.S. Pat. No. 5,625,378.

FIELD OF THE INVENTION

This invention relates to the field of color image reproduction, and more particularly to a method and apparatus for gamut clipping based on user-defined constraints on lightness and hue.

BACKGROUND OF THE INVENTION

FIG. 1 shows one hardware system configuration useful for practicing the present invention. A typical color image reproduction system generally designated 10, includes a scanner 12 for scanning a color image to produce a color digital image RGB. The color digital image RGB is processed in a digital image processing computer 14 to transform the color digital image into a form RGB' for display on a color monitor 16, or a form CMY for reproduction on a color printer 18. The computer 14 receives control signals from a user interface that includes such conventional user interface apparatus as a keyboard 20, and a track ball or mouse 22. The computer 14 may contain a color management program that allows the user to make color balance and tone scale adjustments to the displayed image 24 via means such as a virtual control panel 26 displayed on the monitor and manipulated by the operator via the operator interface. The digital image sent from the computer is in an output color space such as CMY(K) (cyan, magenta, yellow, (black)) for the printer. The computer 14 and operator interface 20-22 may comprise a conventional desk top computer and its operating system with a standard color image management software package.

Colors displayed on an electronic color device such as a CRT, printer or film writer are specified by 3 or 4 channels such as RGB or CMY(K). The range of each channel is typically between 0 and 255. FIG. 2 shows a cube 28 which encloses all the possible code values for a color display device such as color monitor 16 or color printer 18. For each point in the cube, the display device can produce a color patch which can then be measured using an optical instrument such as spectroradiometer and converted to a point in a standard CIE color space such as XYZ, L*a*b*, or L*u*v*. The volume of all points in a standard CIE color space which can be produced by the device is called the gamut of the device. FIG. 3 depicts a solid 30 that represents the gamut of a color printer 18 in L*a*b* color space. It should be noted that for the same code value RGB or CMY, different devices may produce different colors. For this reason, RGB and CMY color spaces are called device-dependent color spaces (DDCS), while the standard CIE color spaces such as XYZ, L*a*b*, and L*u*v* are called device-independent color spaces (DICS). Generally, the gamuts of two devices such as color monitor 16 and color printer 18 are different.

In color reproduction, one goal is to reproduce an input image on an output device so that the reproduced image looks as close to the original as possible. In a digital imaging system, an image is processed pixel by pixel. For each pixel in the input image, its code value in a DDCS is first converted to a point in a DICS. If the point (color) is located inside the gamut of the output device, precise reproduction of this color is possible; otherwise, precise reproduction of this color is impossible, and in this case, this color needs to be changed to a color inside the gamut of the output device. The process of mapping an out-of-gamut color to an in-gamut color is called gamut clipping.

A number of gamut clipping strategies have been proposed in R. S. Gentile, E. Walowit, and J. P. Alleback, "A Comparison of Techniques for Color Gamut Mismatch Compensation", *Journal of Imaging Technology*, vol. 16, no. 5, October 1990; Y. S. Ng, "Input Scanner Color Mapping and Input/Output Color Gamut Transformation", U.S. Pat. No. 5,185,661, issued Feb. 9, 1993; M. C. Stone, W. B. Cowan, J. C. Beatty, "Color Gamut Mapping and the Printing of Digital Color Images", ACM Transections on Graphics, vol. 7 (4), October 1988, pages 249–292; and E. Walowit, "Method for Color Image Processing", U.S. Pat. No. 4,941,038, issued Jul. 10, 1990, all based on three basic attributes: lightness, hue and saturation. The most popular gamut clipping strategy is called clipping C*, where C* represents color saturation. According to this strategy, an out-of-gamut color is mapped to the gamut boundary of the output device by reducing saturation and preserving the hue and lightness. This strategy may work unsatisfactorily in some saturations as shown in FIGS. 4 and 5. FIG. 4 depicts a slice parallel to the lightness axis L* of a CRT gamut 32 at hue angle=330 degree. For the out-of-gamut point p, clipping C* i.e. preserving hue and lightness, brings it along vector 34 to the gamut boundary point v, resulting in significant loss of color saturation. If, however, the point p is mapped to the boundary point u along vector 36, a better visual result can be achieved. FIG. 5 depicts a slice of gamut of a color printer perpendicular to the lightness axis L* with L*=80. For the out-of-gamut color p, clipping C* would move the point along vector 38 to point v. It would apparently be better to move point p along vector 40 to point u with a little hue shift than to map it to v without hue shift but a large loss of saturation. Another gamut clipping strategy is the shortest distance clipping strategy which maps an out-of-gamut color to the closest point on the gamut boundary. The problem with this strategy is that it ignores the fact that the human eyes are more sensitive to hue shift than to lightness change, or saturation change. Other gamut clipping strategies with strict constraints on one or two attributes of lightness, hue and saturation have also been described.

In general, there exists no gamut clipping strategy which is always optimal for all cases. A clipping strategy working perfectly for one image on one device may not work well for another image on a different device. To obtain the best output image on a given output device for a given input image, one may have to try a number of clipping strategies, and select the best one from them.

In summary, prior gamut clipping strategies map an out-of-gamut color to an in-gamut color in one of two ways: (1) with strict constraints on one or two attributes among lightness, hue, and saturation, or (2) without constraint on these attributes at all. These represent two extremes. In many cases, absolutely restricting or absolutely not restricting the change of these attributes may not lead to the best visual results; the best gamut clipping strategy may be the one which allows a small amount of hue shift, a certain amount of lightness change. In general, by allowing a certain amount of hue shift, lightness change, and saturation change, a large number of gamut clipping strategies can be obtained. This invention provides a method for this purpose.

SUMMARY OF THE INVENTION

The present invention is directed to overcoming one or more of the problems set forth above. This invention provides an efficient method for gamut clipping based on user-defined constraints on lightness and hue by: a) defining a gamut surface for the color gamut of an output device; b) specifying a search range based on lightness $\Delta L$ and hue $\Delta H$; and c) for each input color data point outside the gamut, mapping the data point to the closest point on a portion of the gamut surface specified by said search range.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 6:
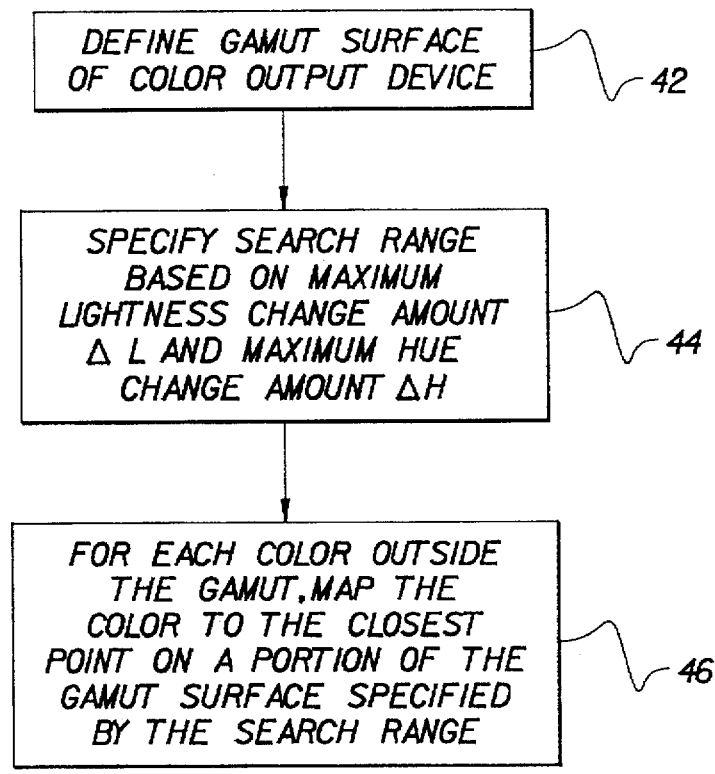
FIG. 6 is a flow chart showing the general method of constrained gamut clipping according to the present invention.

Referring now to FIG. 6, the constrained gamut clipping method of the present invention comprises the following steps. First, the gamut surface of a color output device is defined (42). Next, a search range based on maximum lightness change amount ($\Delta L$) and maximum hue change amount ($\Delta H$) is specified by an operator (44). Finally, for each color outside the gamut surface, the color is mapped to the closest point on a portion of the gamut surface specified by the search range.

Figure 1:
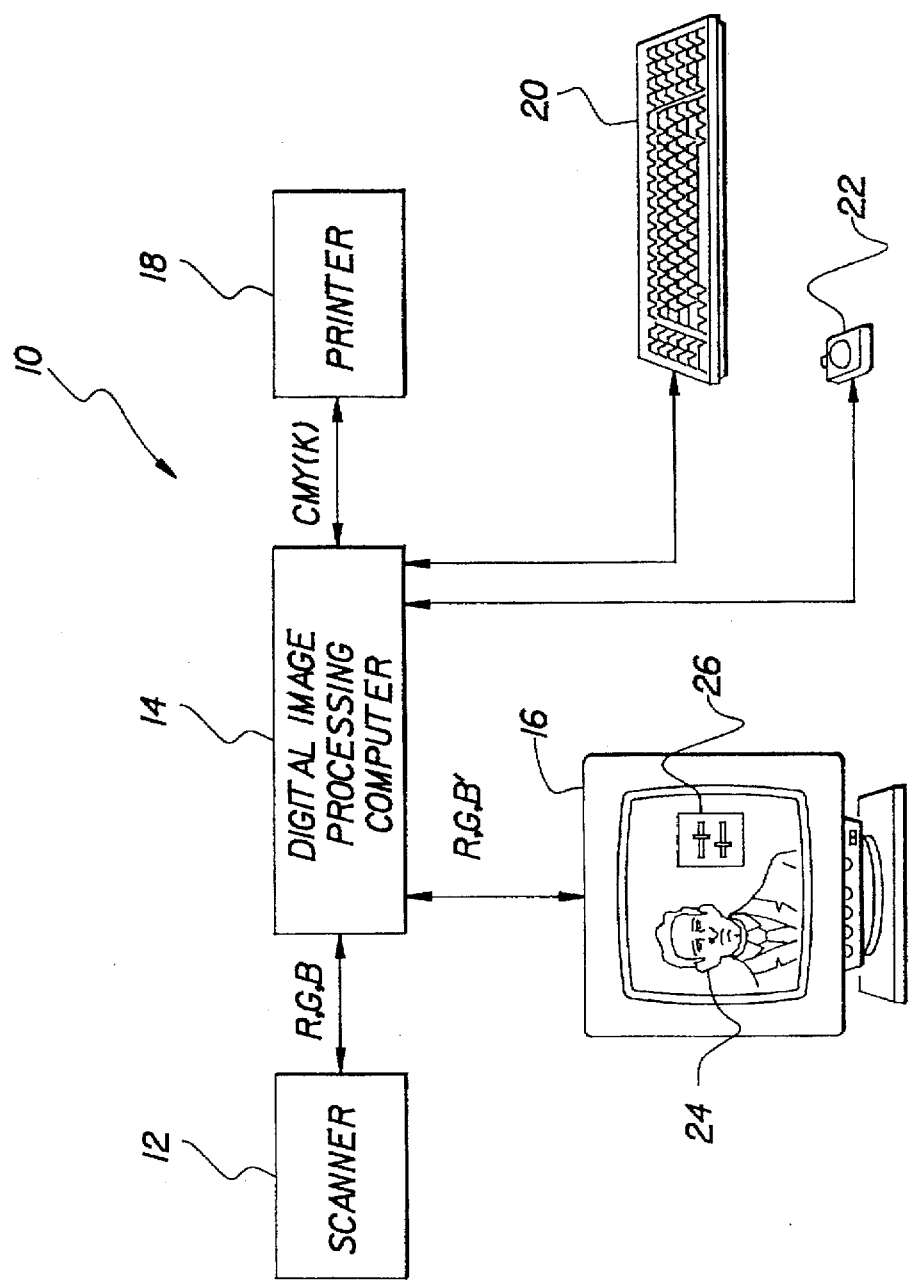
FIG. 1 is a schematic diagram of a color image reproduction system hardware configuration useful for practicing the present invention.
Figure 2:
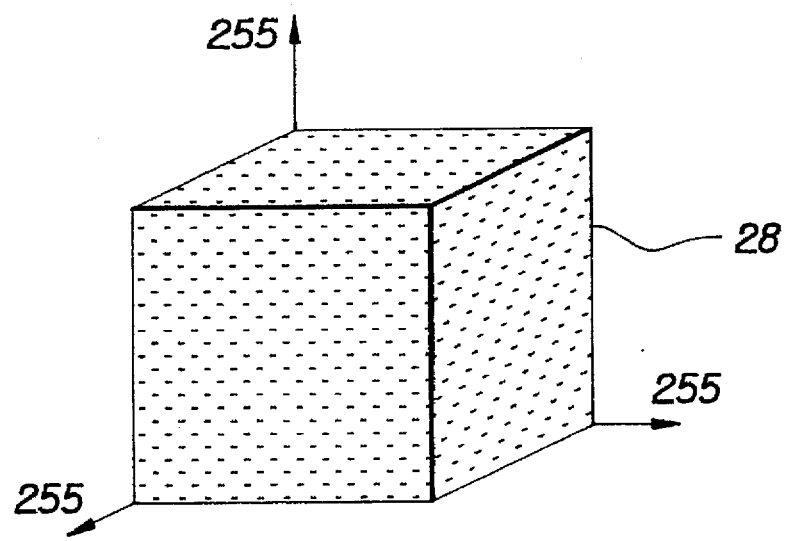
FIG. 2 is a color cube which encloses all valid code values of a color device in a color space.
Figure 3:
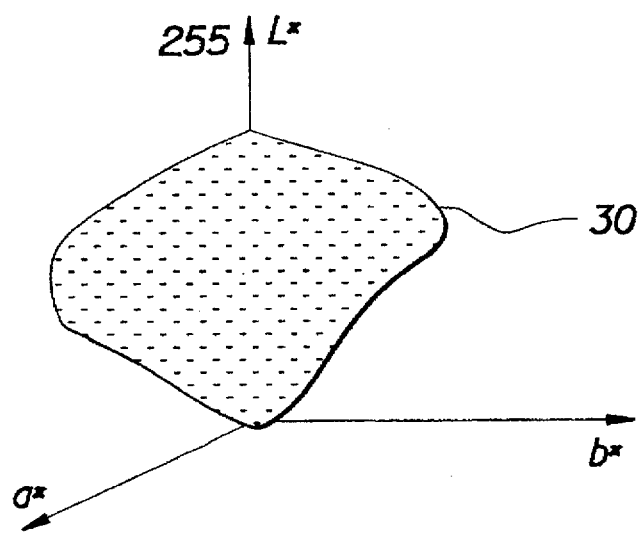
FIG. 3 depicts the gamut of a color printer in an L*a*b* color space.
Figure 4:
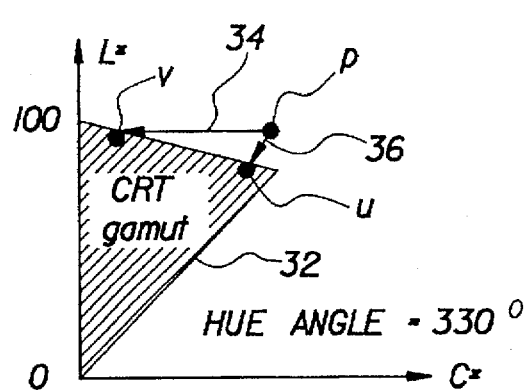
FIG. 4 is a graph of a slice through a CRT gamut showing that a small change in lightness may be preferable to a large reduction of saturation.
Figure 5:
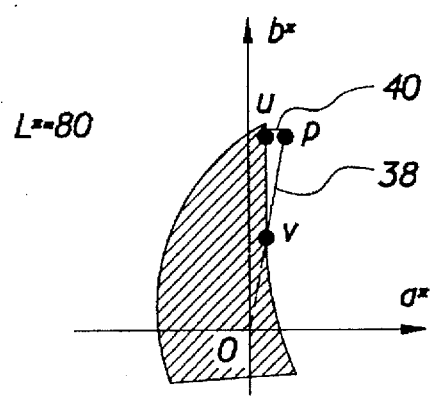
FIG. 5 is a graph of a slice through a color printer gamut showing that a small hue shift may be preferable to a large reduction of saturation.
Figure 7:
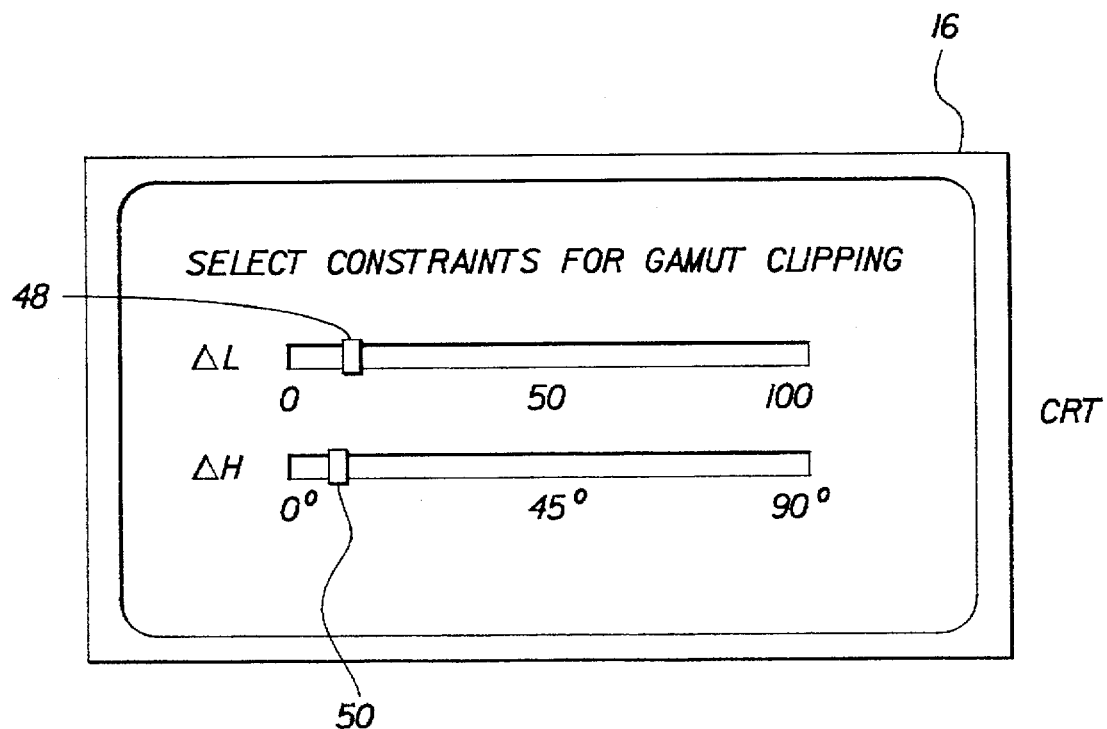
FIG. 7 is a preferred user interface for the constrained gamut clipping.

FIG. 7 shows a preferred user interface for constrained gamut clipping that may be displayed as a virtual control panel on CRT 16. The user interface allows the user to select from a large number of gamut clipping strategies by simply specifying two parameters, $\Delta L$, $\Delta H$, representing the tolerances the user may accept for lightness change and hue shift, respectively. The parameters are selected by the user by moving the control sliders 48 and 50 with a track ball or a mouse 22 to desired positions. Once the two parameters are specified, an out-of-gamut point p(L*,a*,b*) is mapped to the closest gamut surface point p'(L*',a*',b*') under these constraints. The constrained gamut clipping strategy is summarized by equation 1 and 2 below:

$$\text{minimize } \|p(L^*, a^*, b^*) - p'(L^{*'}, a^{*'}, b^{*'})\| \quad (1)$$

$$\text{subject to } |L^* - L^{*'}| \leq \Delta L, |\theta - \theta'| \leq \Delta H \quad (2)$$

where p'(L*',a*',b*') is a gamut boundary point in a gamut descriptor to be defined later, $\theta$ and $\theta'$ are the hue angles of the two points p(L*,a*,b*) and p'(L*',a*',b*').

A large number of gamut clipping strategies may be obtained by varying the two parameters $\Delta L$ and $\Delta H$. For example, if $\Delta L=0$ and $\Delta H=0°$, the result is the clipping C* strategy as previously described; if $\Delta L=100$ and $\Delta H=90°$, the result becomes the shortest distance clipping strategy without constraints, also described previously; and so on.

Figure 8:
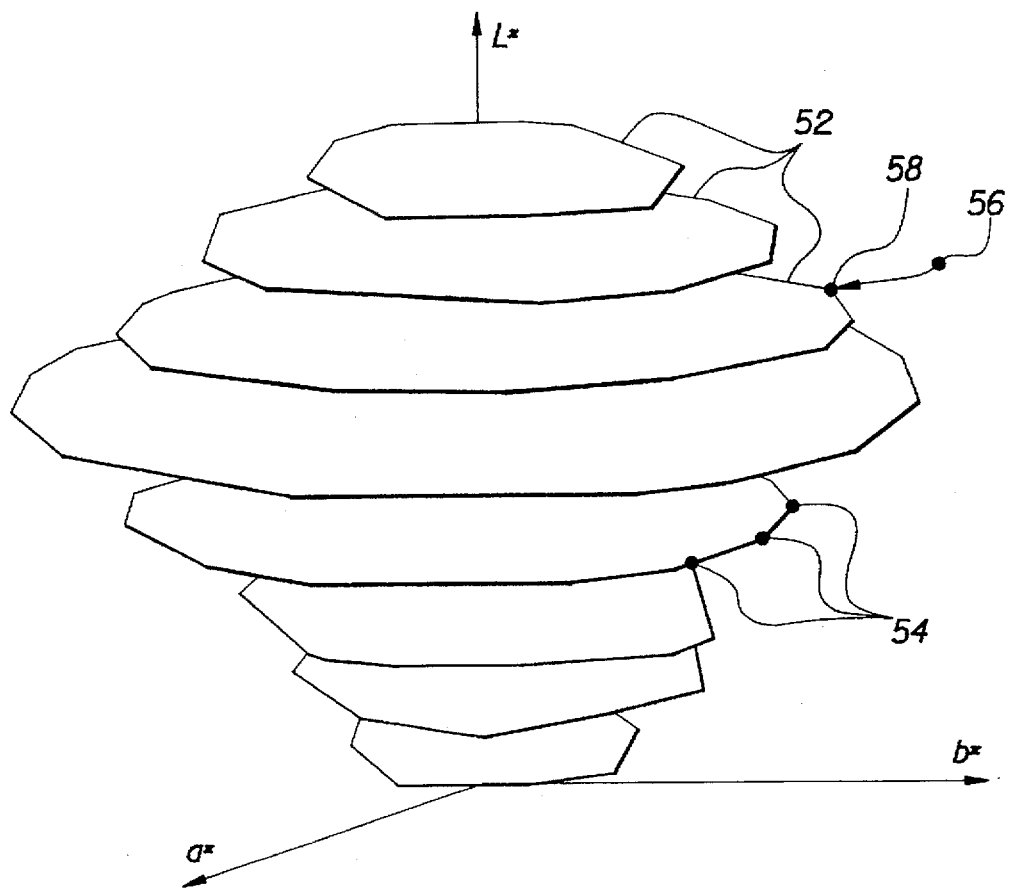
FIGS. 8 and 9 depict the gamut descriptor of a color device.
Figure 9:
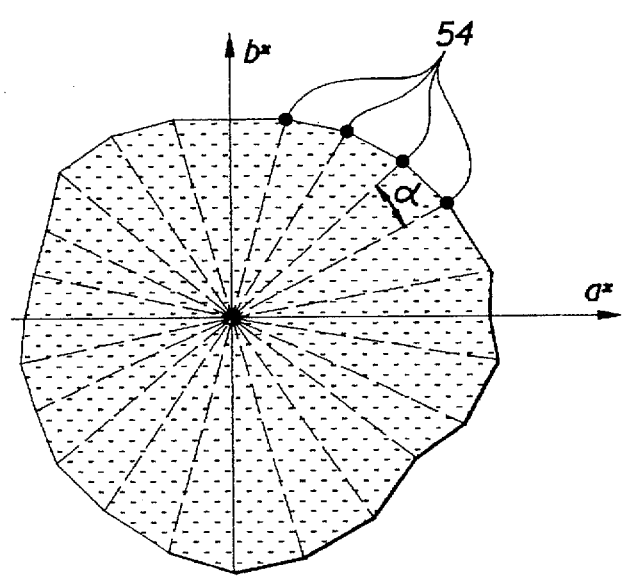

A method of defining the gamut surface of a color device is detailed in "Method and Apparatus for Determining a Gamut Boundary and a Gamut Descriptor", U.S. Ser. No. 08/068,887, filed May 28, 1993, by S. J. Wan in which the concept of gamut descriptor is introduced to represent the gamut surface or boundary. A gamut descriptor is a set of carefully selected gamut surface points in a DICS. FIG. 8 and 9 depicts a gamut descriptor of a color device. For convenience of discussion, we use L*a*b* as the DICS, and we define the gamut descriptor as follows. As shown in FIG. 8, all points in the gamut descriptor are located on K planes 52 perpendicular to axis L*. The distance between two adjacent planes is the same, 100/(K–1). (Note that the range for L* is 0 to 100). As shown in FIG. 9, there are S points 54 on the periphery of each plane. The angle $\alpha$ between two adjacent points 54 on a plane is the same, 360/S degree.

A gamut descriptor can be represented by an array GD[K][S]. The total number of gamut boundary points in a gamut descriptor is K×S. Each point 54 in GD[][] has two components, GD[][].a and GD[][].b, representing the value of a* and b*, respectively. The L*a*b* value for a point 54 on the i-th plane at j×360/(S–1) angle can be determined by:

$$L^*=100 \times i/(K-1), a^*=GD[i][j].a, b^*=GD[i][j].b, i=0, \ldots, K-1,$$
$$j=0, \ldots, S-1. \quad (3)$$

Using a gamut descriptor, e.g., an array, to represent the gamut of a device as described above provides a data structure suitable for the implementation of constrained gamut clipping strategy in an efficient way. For an out-of-gamut point 56 in FIG. 8, we can map it to the closest point 58 in the gamut descriptor under the constraints specified by the user rather than map it to the true closest gamut surface point. This can significantly increase the efficiency of the gamut clipping process. The cost for doing so is a certain loss of accuracy. The accuracy, however, can be improved by increasing the size of (i.e. the number of points in) the gamut descriptor.

When the two parameters ΔL, ΔH are specified by the user, one can map an out-of-gamut point p(L*,a*,b*) to a point in the gamut descriptor in the following way. First determine the search range among the K×S gamut boundary points in GD[][]: search those points GD[i][j] satisfying $$\left| \frac{100 \times i}{(K-1)} - L^* \right| \leq \Delta L, \quad (4)$$

$$\left| \frac{j \times 360}{(S-1)} - \frac{180}{\pi} \times \cos^{-1}\left( \frac{a^*}{(a^{*2}+b^{*2})^{1/2}} \right) \right| \leq \Delta H \quad (5)$$

Figure 10:
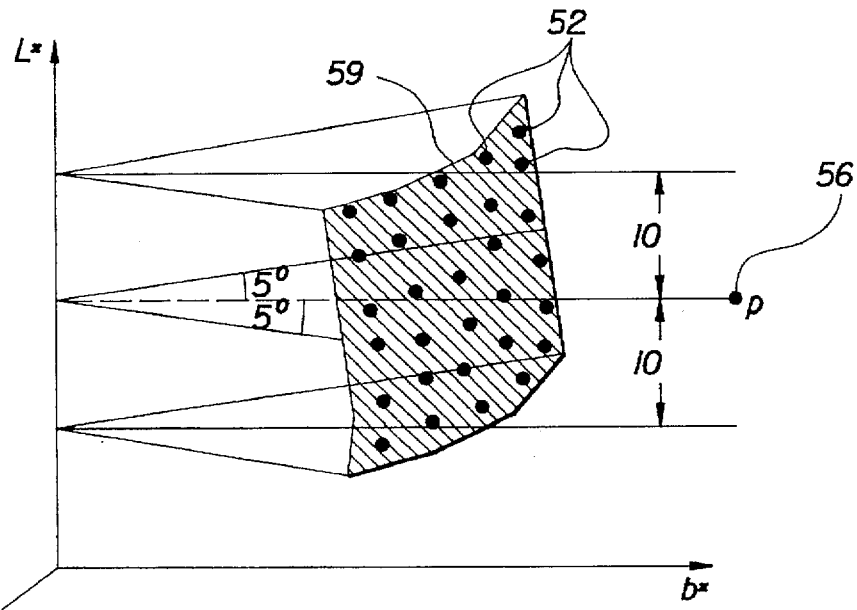
FIG. 10 depicts the search range defined by $\Delta L=10$ and $\Delta H=5°$ for the constrained gamut clipping.

Then, compute the distance between p and each of those identified points. The point closest to p is chosen to be the clipping target for p. FIG. 10 shows an example with ΔL=10, and ΔH=5°. The portion of the gamut surface specified by the range ΔL=10, ΔH=5° is designated 59 and includes a number of points 52 on the gamut surface. The point p, labeled 56 is mapped to the closest point within the portion 59.

In the implementation of the constrained gamut clipping scheme of the present invention, the gamut descriptor can be computed off-line, and the data can be stored in a data file. Optionally, the size of the gamut descriptor may be increased by interpolation for improved accuracy. Once a gamut descriptor is obtained, an input image may be processed directly or indirectly. FIG. 10 is a flowchart for direct constrained gamut clipping according to the present invention, which consists of the following steps:

1) Read in the gamut descriptor of the output device produced off line (60);
2) Read in the input image (62);
3) Read in the parameters ΔL, ΔH from the user (64);
4) For each pixel (66), convert it to a point in L*a*b* (68). If the point is inside the output device gamut (70), compute its corresponding output code value by using interpolation (72); if it is out of the device gamut, search for the closest point from the gamut surface points specified by the parameters ΔL, ΔH (74), and use its corresponding code value as the output code value (76).

If this is the end of the image (78), output the image to the display device (80). If not, pick up the next pixel and continue from step (66). After the image is displayed, the operator may decide to adjust ΔL and ΔH and repeat the process (82).

Figure 11:
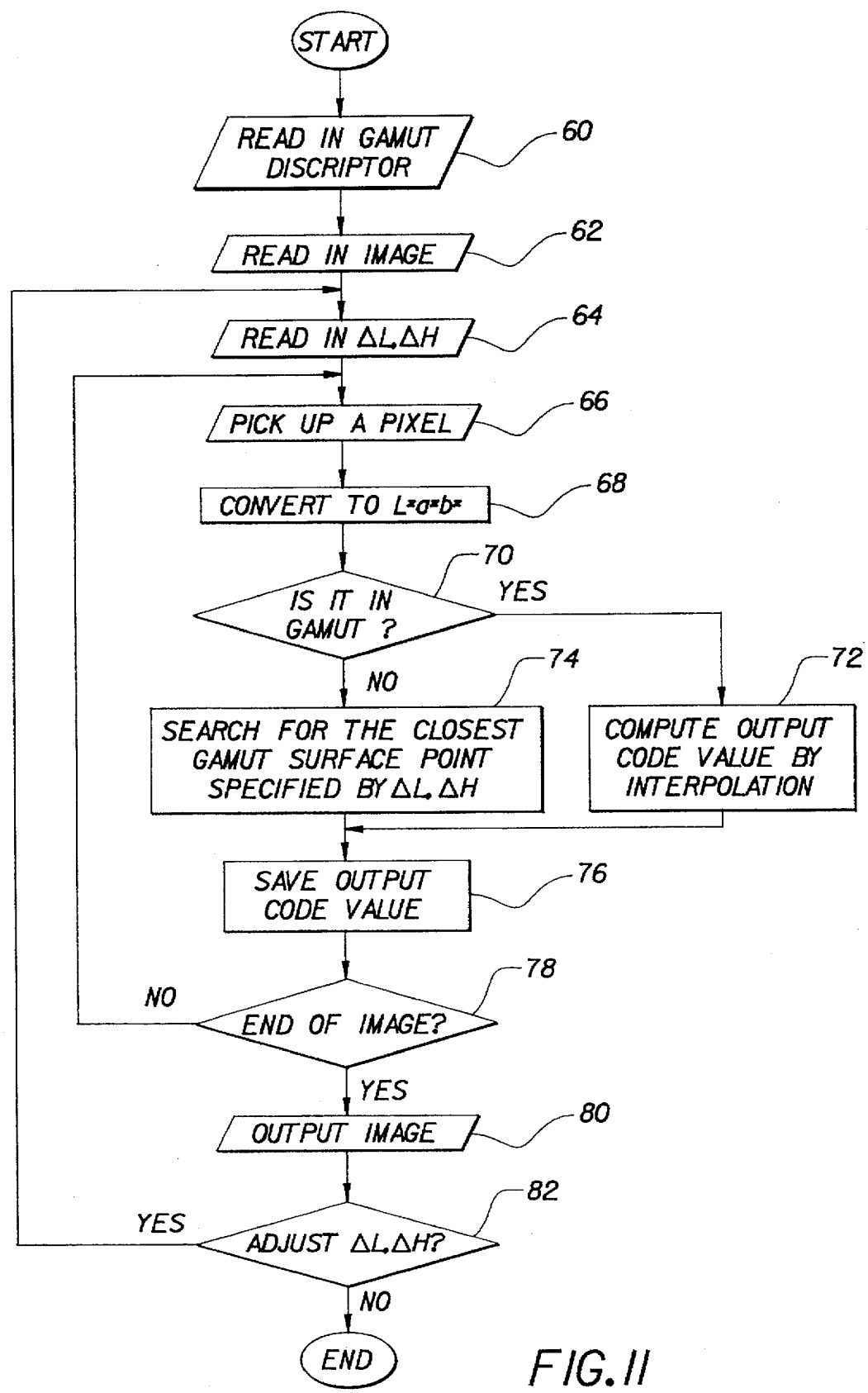
FIG. 11 is a flowchart of image process for direct constrained gamut clipping.
Figure 12:
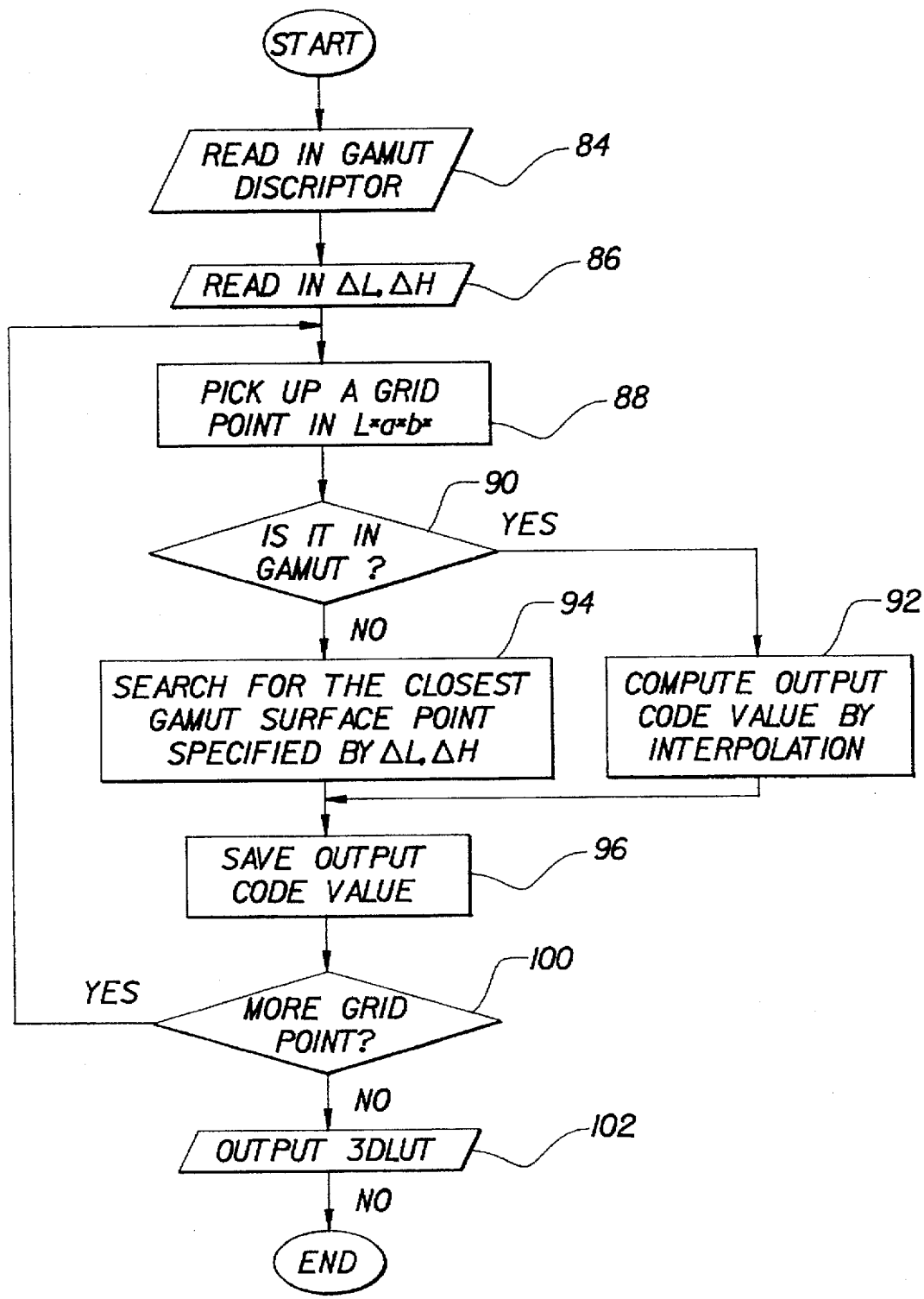
FIG. 12 is a flowchart for creating a 3D look-up table with constrained gamut clipping.
Figure 13:
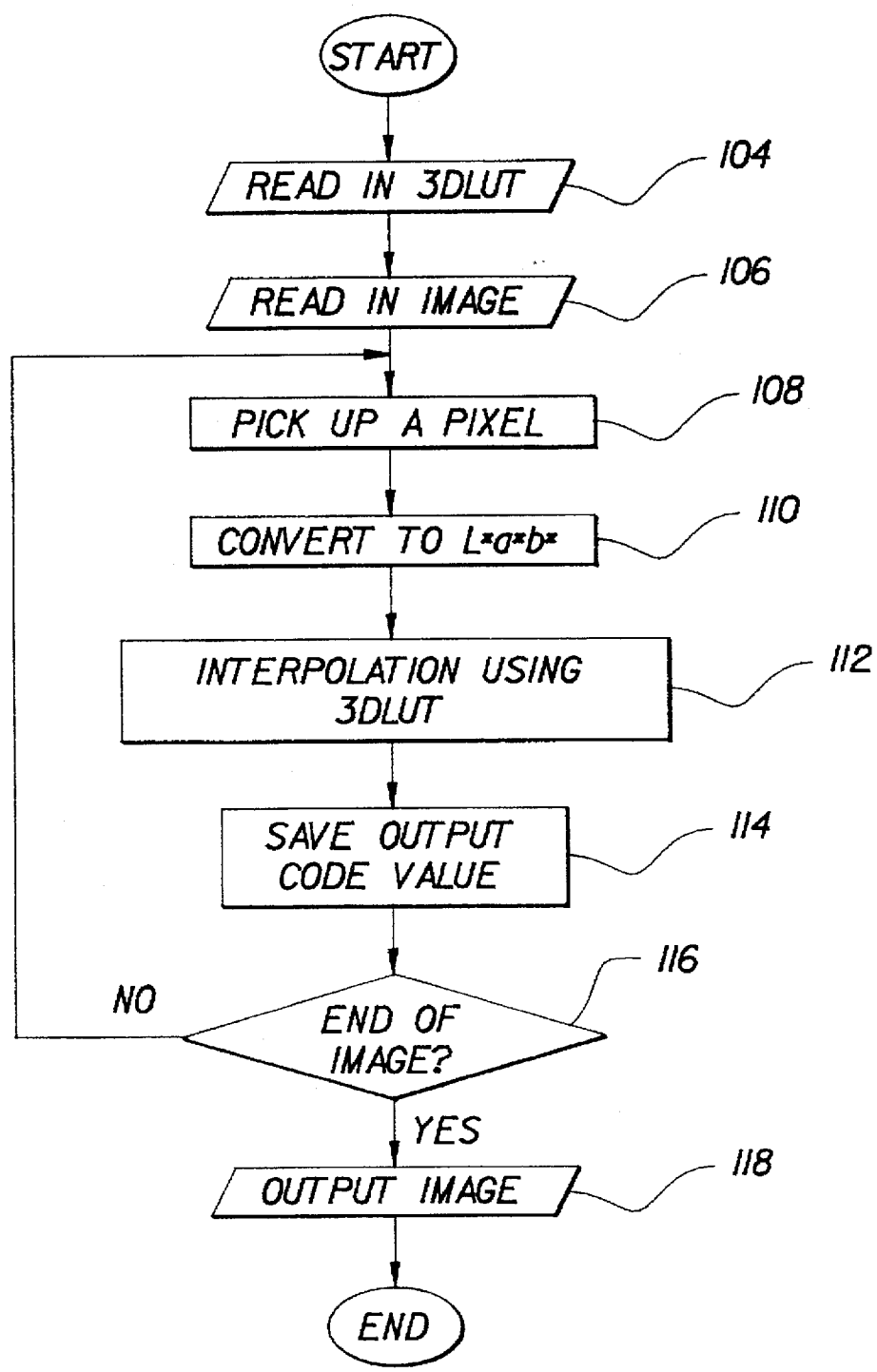
FIG. 13 is a flowchart of image process for indirect constrained gamut clipping.

Indirect image processing consists of two steps illustrated in FIGS. 11 and 12. First, a 3D look-up table (3DLUT) for converting color signals from L*a*b* to the output device code values is created. A method for creating such a look-up table is detailed in "Method and Apparatus for Mapping Between Color Spaces and Creating a Three-dimensional Inverse Look-up Table", U.S. Ser. No. 08/068,941, filed May 28, 1993 by S. J. Wan, R. Miller, and J. Sullivan. The 3DLUT is created based on the constraints ΔL, ΔH specified by the user as described in FIG. 11 according to the following steps:

1) Read in the gamut description of the output device produced off line (34);
2) Read in ΔL, ΔH from the operator (86);
3) Pick up a grid point in L*a*b* color space (88);
4) If the grid point is in gamut (90), compute the output code value by interpolation (92);
5) Otherwise, search for the closest gamut surface point specified by ΔL, ΔH (94);
6) Save the output code value (76);
7) If there are more grid points (98), pick up the next grid point (100);
8) Otherwise, output a 3D look-up table that maps the grid points in L*a*b* to output code values (102).

Second, process images using the 3DLUT as depicted in FIG. 12. The image processing is done according to the following steps:

1) Read in the 3D look-up table generated as described above (104);
2) Read in the color digital image (106);
3) Pick up a pixel from the image (108);
4) Convert the pixel to L*a*b* space (110);
5) Find a corresponding output device code value using the 3D look-up table and interpolation (112); and
6) Save the output code value (114).

If the end of the image has been reached (116) output the code values for the entire image (118). Otherwise, return to step (108) and pick up the next pixel in the image. Note that the 3DLUT can be created off-line prior to the processing. Once a 3DLUT is given, processing an image using the 3DLUT can be done very fast. This is an advantage of the indirect processing over the direct processing.

PARTS LIST 10 color image reproduction system
12 scanner
14 computer
16 color monitor
18 printer
20 keyboard
22 track ball or mouse
24 color image
26 virtual control panel
28 all possible code values
30 gamut of a printer in L*a*b* space
32 gamut slice
34 vector from point p to point v
36 vector from point p to point u
38 vector from point p to point v
40 vector from point p to point u
(42) define gamut step
(44) specify search range step
(46) map color to gamut surface step
(48) ΔL control slides
(50) ΔH control slides
(52) planes of points in color gamut
(54) points on periphery of planes
(56) out of gamut point
(58) points on surface of gamut
(59) portion of gamut surface defined by ΔL, ΔH
(60) read in gamut descriptor step
(62) read in image step
(64) read in ΔL, ΔH step
(66) pick pixel step
(68) convert pixel to L*a*b* space step
(70) test if pixel in gamut step
(72) computer output code value step
(74) search for closest gamut surface point step
(76) save output code value step
(78) end of image test step
(80) output image step
(82) adjust L, H step
(84) read in gamut descriptor step
(86) read in L, H step
(88) pick up grid point in L*a*b* space step
(90) test if point in gamut step

(92) compute output code value step
(94) search for closest gamut point on gamut surface step
(96) save output code value step
(100) test for more grid points step
(102) output 3D LUT step
(104) read in 3D LUT step
(106) read in image step
(108) pick up pixel step
(110) convert pixel to L*a*b* space step
(112) use 3D LUT and interpolation to find output code value step
(114) save output code value step
(116) test for end of image step
(118) output image step

We claim:

1. A method of converting input color data representing an image to output color data for displaying the image on an output device having a color gamut, the image having color data outside of the color gamut of the output device, comprising the steps of:

a) defining a color gamut surface for the output device;
   b) specifying two parameters, $\Delta L$ and $\Delta H$ representing user defined tolerances for lightness change and hue shift, respectively in the input color data, wherein $\Delta L$ and $\Delta H$ may have any value in a range between zero and a maximum value representing no constraint, whereby a large number of gamut clipping strategies may be obtained;
   c) detecting the color data points in the input image that are outside of the color gamut of the output device;
   d) for each input color data point outside the color gamut surface, mapping the input color data point to a closest point on a portion of the gamut surface specified by said two parameters $\Delta L$ and $\Delta H$ with respect to the position of the input color data point to produce output color data; and
   e) supplying the output color data to the output device to display the color image.

2. A method of generating a 3D Look-up table with constrained gamut clipping for converting input color data representing an image to output color data for displaying the image on an output device having a color gamut, the image having color data outside of the color gamut of the output device, comprising the steps of:

a) defining a color gamut surface for the output device;
   b) specifying two parameters, $\Delta L$ and $\Delta H$ representing user defined tolerances for lightness change and hue shift, respectively in the input color data, wherein $\Delta L$ and $\Delta H$ may have any value in a range between zero and a maximum value representing no constraint, whereby a large number of gamut clipping strategies may be obtained;
   c) partitioning a device independent color space into a plurality of grid points;
   d) detecting the color data points in the input image that are outside of the color gamut surface for the output device;
   e) for each grid point outside the color gamut surface, mapping the grid point to a closest point on a portion of the color gamut surface specified by said two parameters $\Delta L$ and $\Delta H$ with respect to the position of the input color data point to produce output color data;
   f) generating a 3D LUT for transforming input color data to output color data such that input color data points inside the color gamut surface are unchanged and color data points outside the color gamut surface are clipped to the closest points on the color gamut surface identified in step e); and
   g) supplying the output color data to the output device to display the color image.

3. The method claimed in claim 1, wherein said gamut surface is defined using a gamut descriptor GD[K][S], where GD is a K by S array of points in device independent color space L*a*b*, the L*a*b* color space being partitioned into K planes perpendicular to the L* axis, with S points on each plane, distributed at equal angles around the L* axis, indicating the gamut surface, each point in GD[][] having two components, GD[][].a and GD[][].b, representing the value of a* and b* respectively, and wherein an L*a*b* value for a point on an i-th plane at angle $j \times 360/(S-1)$ is determined by:

$$L^* = 100 \times i/K - 1, \quad a^* = GD[i][j].a, \quad b^* = GD[i][j].b, \quad i = 0, \ldots, K-1; \quad j = 0, \ldots S-1.$$

4. The method claimed in claim 3, wherein said input color data points outside the color gamut surface are defined as those points in the gamut descriptor meeting the conditions:

$$\left| \frac{100 \times i}{(K-1)} - L^* \right| \leq \Delta L,$$

and $$\left| \frac{j \times 360}{(S-1)} - \frac{180}{\pi} \times \cos^{-1}\left( \frac{a^*}{(a^{*2}+b^{*2})^{1/2}} \right) \right| \leq \Delta H$$

5. A method of converting an input color image having pixels to output code values with direct constrained gamut clipping, comprising the steps of:

a) providing a gamut descriptor that defines a color gamut of an output device;
   b) providing an input color image;
   c) providing search parameters $\Delta L$ and $\Delta H$ representing user defined tolerances for lightness change and hue shift, respectively in the input color image, wherein $\Delta L$ and $\Delta H$ may have any value in a range between zero and a maximum value representing no constraint, whereby a large number of gamut clipping strategies may be obtained;
   d) converting the pixels of the input color image to a device independent color space;
   e) for each pixel of the input color image that is inside the gamut of the output device, computing an output code value by interpolation;
   f) for each pixel of the input color image that is outside the gamut, find a closest point within a portion of the gamut descriptor specified by $\Delta L$ and $\Delta H$ with respect to the position of the input color data point to produce output color data, and computing a corresponding output code value using interpolation; and
   g) displaying a color image on the output device using the output code values.

6. A method of creating a 3D Look-up table with constrained gamut clipping for converting input color data representing an image to output color data for displaying the image on an output device having a color gamut, the image having color data outside of the color gamut of the output device, comprising the steps of:

a) providing a gamut descriptor that defines a color gamut of the output device;

b) providing search parameters DL and DH representing user defined tolerances for lightness change and hue shift respectively in a color image, wherein ΔL and ΔH may have any value in a range between zero and a maximum value representing no constraint, whereby a large number of gamut clipping strategies may be obtained;

c) defining a grid having grid points in a device independent color space (DICS), and for each grid point that is in the color gamut, computing a corresponding output code value;

d) detecting the color data points in the input image that are outside of the color gamut surface for the output device;

e) for each grid point that is outside of the color gamut surface, finding a point within a portion of the gamut descriptor defined by ΔL and ΔH with respect to the position of the input color data point, and computing a corresponding output code value;

f) generating a 3D look-up table relating the grid points in the DICS to output code values; and g) supplying the output color data to the output device to display the color image.

7. A method of converting an input color image to output code values with indirect constrained gamut clipping, comprising the steps of:

a) providing a 3D look-up table by:
 1) providing a gamut descriptor;
 2) providing search parameters ΔL and ΔH representing user defined tolerances on lightness and hue changes respectively, wherein ΔL and ΔH may have any value in a range between zero and a maximum value representing no constraint, whereby a large number of gamut clipping strategies may be obtained;
 3) defining a grid in a device independent color space (DICS), and for each grid point that is in gamut, computing an output code value by interpolation;
 4) for each grid point that is out of gamut, finding a point within a portion of the gamut descriptor defined by ΔL and ΔH with respect to the position of the input color data point, and computing a corresponding output code value; and
 5) generating a 3D look-up table relating the grid points in the DICS to output code values; and b) for each pixel of the input color image, finding an output code value using said 3D lookup table and interpolation.

8. Apparatus for processing a digital color image, comprising:

a) means for receiving a digital color image having pixels;

b) a digital color printer having a color gamut having a color gamut surface and being driven by output code values;

c) a computer for transforming said digital color image to output code values for driving said digital color printer;

d) operator input means for specifying search parameters ΔL and ΔH representing user defined tolerances for lightness change and hue shift, respectively in the digital color image, wherein ΔL and ΔH may have any value in a range between zero and a maximum value representing no constraint, whereby a large number of gamut clipping strategies may be obtained; and e) said computer including means for mapping each pixel of said digital color image that is outside of said color gamut of said digital color printer to a point on a portion of said gamut surface defined by ΔL and ΔH with respect to the position of the input color data point, and determining a corresponding output code value for said point.

* * * * *